United States Patent
Hoshino et al.

(10) Patent No.: US 12,172,674 B2
(45) Date of Patent: Dec. 24, 2024

(54) VEHICLE CONTROL APPARATUS

(71) Applicant: Mazda Motor Corporation, Hiroshima (JP)

(72) Inventors: Yoko Hoshino, Aki-gun (JP); Shimpei Kusumoto, Aki-gun (JP); Junichiro Kuwahara, Aki-gun (JP); Megumi Nakano, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 319 days.

(21) Appl. No.: 17/727,849

(22) Filed: Apr. 25, 2022

(65) Prior Publication Data

US 2022/0371623 A1 Nov. 24, 2022

(30) Foreign Application Priority Data

May 21, 2021 (JP) ................. 2021-085877

(51) Int. Cl.
*B60W 60/00* (2020.01)
*B60W 30/02* (2012.01)
*B60W 50/14* (2020.01)

(52) U.S. Cl.
CPC ........ *B60W 60/0015* (2020.02); *B60W 30/02* (2013.01); *B60W 50/14* (2013.01); *B60W 2540/223* (2020.02); *B60W 2540/229* (2020.02)

(58) Field of Classification Search
CPC .. B60W 60/0015; B60W 30/02; B60W 50/14; B60W 2540/223; B60W 2540/229; B60W 10/06; B60W 10/18; B60W 10/20
See application file for complete search history.

(56) References Cited

U.S. PATENT DOCUMENTS

2003/0146841 A1* 8/2003 Koenig ............... A61B 5/18 340/576
2015/0183441 A1* 7/2015 Aoki ............... B60W 40/09 434/62

(Continued)

FOREIGN PATENT DOCUMENTS

JP 2018-167777 A 11/2018
JP 6579183 B2 * 9/2019

OTHER PUBLICATIONS

Machine translation of JP6579183B2 downloaded May 18, 2024 from Espacenet (Year: 2024).*

(Continued)

*Primary Examiner* — Peter D Nolan
*Assistant Examiner* — Tanya C Sienko
(74) *Attorney, Agent, or Firm* — XSENSUS LLP

(57) ABSTRACT

A vehicle control apparatus includes a circuitry capable of controlling a vehicle. The circuitry is configured to estimate a traffic risk score, a travel risk score, and a driving ability score. The circuitry is configured to change a first threshold, with which automated vehicle attitude stability control is initiated, so as to promptly execute the automated vehicle attitude stability control when a travel risk is not avoided by the driving ability, change a second threshold, with which automatic entry avoidance control is initiated, so as to promptly execute the automatic entry avoidance control when the traffic risk is not avoided by the driving ability, and control the vehicle to travel on a target travel route when the traffic risk and the travel risk are not avoided by the driving ability or when the driving ability is lower than a specified level.

20 Claims, 6 Drawing Sheets

(56) References Cited

U.S. PATENT DOCUMENTS

2018/0281808 A1* 10/2018 Minegishi ............. B60W 10/20
2021/0316737 A1* 10/2021 Iwase ................... A61B 5/4035
2022/0089192 A1* 3/2022 Gyllenhammar ..... G01S 17/931
2022/0276653 A1* 9/2022 Wray ................. G01C 21/3658
2024/0000354 A1* 1/2024 Kunieda ............. G07C 5/0808

OTHER PUBLICATIONS

Abstract of SAE report "Identification of Unskillful Driver Based on Driving Behavior and Adaption of Safety and Comfort Functions for Driver Assistance" DOI SAE Int. J . Adv. & Curr. Prac. in Mobility 1 {1):3,• 12, 2019, https:// doi.org/1 0.4271 /2019-26-0023. (Year: 2019).*
"Driver Inattention Monitoring System for Intelligent Vehicles: A Review" by Y.Dong et al., IEEE Transactions on Intelligent Transportation Systems, vol. 12, No. 2, Jun. 2011 (Year: 2011).*

* cited by examiner

FIG. 6

| DRIVING MOTIVATION | LOW | LOW | LOW |
|---|---|---|---|
| ATTENTION LEVEL | LOW | MODERATE | HIGH |
| MIND | SLEEPY | BOTHERSOME | SCARED OF DRIVING |
| CONDITION | NOTICEABILITY UNOBSERVED<br>HIGH FREQUENCY OF YAWING<br>BAD DRIVING POSTURE | DISTRACTED<br>HIGH FREQUENCY OF INATTENTIVENESS<br>BAD DRIVING POSTURE | NARROW FIELD OF VIEW<br>FORWARD LEANING POSTURE<br>ENLARGED PUPILS<br>NO CHANGE IN FACIAL EXPRESSION |
| VEHICLE OPERATION | DELAY IN OPERATION<br>REDUCED HOLDING FORCE<br>REDUCED DEPRESSION FORCE<br>REFLEX ACTION IMPOSSIBLE | DELAY IN OPERATION<br>REFLEX ACTION POSSIBLE | DELAY IN OPERATION<br>HIGH FREQUENCY OF CORRECTION OPERATION<br>HIGH FREQUENCY OF BRAKING |

| DRIVING MOTIVATION | MODERATE | MODERATE | HIGH |
|---|---|---|---|
| ATTENTION LEVEL | LOW | MODERATE | HIGH |
| MIND | SLEEPY/DESIRED TO WAKEN | DESIRED TO ARRIVE AT DESTINATION | FUN |
| CONDITION | NOTICEABILITY UNOBSERVED<br>HIGH FREQUENCY OF BLINKING<br>HIGH FREQUENCY OF YAWING<br>FREQUENT HEAD MOVEMENT | NOTICEABILITY OBSERVED<br>MOVEMENT OF SIGHTLINE BETWEEN FRONT AND MIRROR | FAR GAZING POINT<br>WIDE FIELD OF VIEW |
| VEHICLE OPERATION | DELAY IN OPERATION<br>FLUCTUATING HOLDING FORCE<br>FLUCTUATING DEPRESSION FORCE | VARIABLE OPERATION<br>REFLEX ACTION POSSIBLE | NO DELAY IN OPERATION |

VEHICLE CONTROL APPARATUS

CROSS-REFERENCE TO RELATED APPLICATION

The present application claims priority to Japanese application number 2021-085877 filed in the Japanese Patent Office on May 21, 2021, the entire contents of which being incorporated herein by reference.

TECHNICAL FIELD

The present disclosure relates to a vehicle control apparatus and, in particular, to a vehicle control apparatus for driving assistance.

BACKGROUND ART

Currently, various types of autonomous car technology have been developed, and there are two development concepts. A first development concept is pursuit of convenience. In the technology based on this development concept, the vehicle performs almost all vehicle operations on behalf of a driver. A second development concept is pursuit of physical and mental activation of the driver. In the technology based on this development concept, the driver performs the vehicle operation by exerting his or her own driving ability to the fullest extent possible, and the vehicle intervenes in the vehicle operation in an auxiliary manner.

For the physical and mental activation of the driver, the driver's current driving ability is preferably balanced with required driving ability that is required of the driver according to traffic environment or the like. When these are not balanced, the driver may feel bored of driving or, conversely, be psychologically stressed by driving. In particular, an elderly person with reduced driving ability and a person with mild cognitive impairment (MCI) tend to feel stress.

In view of the above, the present applicant has proposed a vehicle control apparatus that provides driving assistance or a driving load so as to balance the required driving ability with the current driving ability on the basis of the second development concept (for example, see Patent document 1). With this vehicle control apparatus, the driver can drive the vehicle in a balancing state between the required driving ability and the current driving ability. As a result, the driver can enjoy and concentrate on safe driving regardless of difficulty of the traffic environment or a level of the current driving ability.

PRIOR ART DOCUMENTS

Patent Documents

[Patent document 1] Japanese Patent No. 6,555,649

SUMMARY

Problems to be Solved

However, in the technique disclosed in Patent document 1, since the driving assistance by the vehicle compensates for insufficiency in the driver's current driving ability, the driver does not have to maintain and improve his or her current driving ability. The driver's current driving ability may rather be reduced with time.

Embodiments have been made to solve the problems as described above, and therefore has a purpose of providing a vehicle control apparatus capable improving a driver's driving ability.

Means for Solving the Problems

In order to achieve the above purpose, embodiments are directed to a vehicle control apparatus that executes driving assistance control for a vehicle such that the vehicle travels according to traffic environment and travel environment around the vehicle, and the vehicle control apparatus includes a controller that calculates a target travel route on the basis of the traffic environment and the travel environment and can control the vehicle such that the vehicle travels on the target travel route. The controller executes: traffic environment evaluation processing to estimate a traffic risk score that represents a magnitude of a traffic risk caused by entry of the vehicle to a risk area in the traffic environment, in the traffic environment evaluation processing, the risk area including a traffic participant and/or a boundary of a travel road; travel environment evaluation processing to estimate a travel risk score that represents a magnitude of a travel risk in the travel environment, the travel risk destabilizing a posture of the vehicle; and driving ability evaluation processing to estimate a driving ability score that represents a level of driving ability for a driver of the vehicle to avoid the traffic risk and the travel risk. The controller executes first setting change processing to change a threshold, with which automated vehicle attitude stability control is initiated, so as to promptly execute the automated vehicle attitude stability control for stabilizing the posture of the vehicle when determining, on the basis of the driving ability score and the travel risk score, that the travel risk is be avoided by the driving ability, executes second setting change processing to change a threshold, with which automatic entry avoidance control is initiated, so as to promptly execute the automatic entry avoidance control for avoiding the entry of the vehicle to the risk area when determining, on the basis of the driving ability score and the traffic risk score, that the traffic risk is not avoided by the driving ability, and controls the vehicle to travel on the target travel route when determining, on the basis of the driving ability score, the traffic risk score, and the travel risk score, that the traffic risk and the travel risk are not avoided by the driving ability or when determining, on the basis of the driving ability score, that the driving ability is lower than a specified level.

Accordingly, the risks during travel of the vehicle are distinguished between the traffic risk that depends on the traffic environment and the travel risk that depends on the travel environment. Then, according to the risk that is estimated to be unavoidable by the driver's driving ability, the driving assistance control by the automatic entry avoidance control or the automated vehicle attitude stability control can intervene further promptly. In this way, in the present invention, the appropriate driving assistance control can easily intervene in response to the driving ability in a lower level among the driver's driving ability corresponding to the two risks. In addition, since the driving assistance control intervenes promptly in a state where a risk level of the vehicle is low, a risk-avoidance vehicle operation by the driving assistance control becomes a relatively gentle operation, and thus the abrupt risk-avoidance vehicle operation is avoided. Accordingly, through the prompt and gradual intervention of the driving assistance control, the driver can learn a situation (surrounding environment and a vehicle operation by the driver) where the driving assistance control intervenes easily. In addition, the driver can improve the vehicle operation in a manner to prevent the intervention of the driving assistance control for the same type of the risk. Therefore, the driving ability in the low level can be improved in a long term.

In an embodiment, the controller notifies the driver of the vehicle that the automated vehicle attitude stability control and the automatic entry avoidance control are executed when the automated vehicle attitude stability control and the automatic entry avoidance control are executed. Accordingly, the driver can recognize the intervention of the driving assistance control by means of the notification.

In an embodiment, when the traffic risk and the travel risk no longer exist, the controller sets back the thresholds, which have been changed in the first setting change processing and the second setting change processing, to default thresholds of the vehicle. According to the present invention that is configured as described above, every time the risk occurs, setting of the threshold for the driving assistance control can be changed on the basis of the current driving ability score and one of the traffic risk score and the travel risk score. Therefore, when the driver's driving ability is improved, the threshold is no longer changed from the default threshold, and freedom of the vehicle operation is increased as the driver's driving ability is increased.

In an embodiment, the driving ability scores include a basic driving ability score and a short-term driving ability score, the controller updates a driver model by learning a vehicle operation by the driver of the vehicle and estimates the basic driving ability score on the basis of the driver model to avoid the traffic risk and the travel risk, and the controller estimates the short-term driving ability score on the basis of an attention level and/or driving motivation of the driver of the vehicle. Accordingly, the driving ability is divided into a driving skill that fluctuates in a long term and short-term driving ability (a noise factor) that fluctuates in a short term. In this way, it is possible to further accurately determine the current driving ability and to appropriately provide the driving assistance control.

In an embodiment, the controller executes driving motivation determination processing to determine the driving motivation of the driver, and, in this driving motivation determination processing, determines the driving motivation of the driver at least on the basis of the driver's facial expression, driving posture, or vehicle operation.

Advantages

The vehicle control apparatus according to embodiments can improve the driver's driving ability.

BRIEF DESCRIPTION OF THE DRAWINGS

FIG. 6 is a table illustrating the driver's condition according to the driving motivation and the attention level in the embodiment.

DETAILED DESCRIPTION

A description will hereinafter be made on a vehicle control apparatus according to an embodiment with reference to the accompanying drawings.

Figure 1:
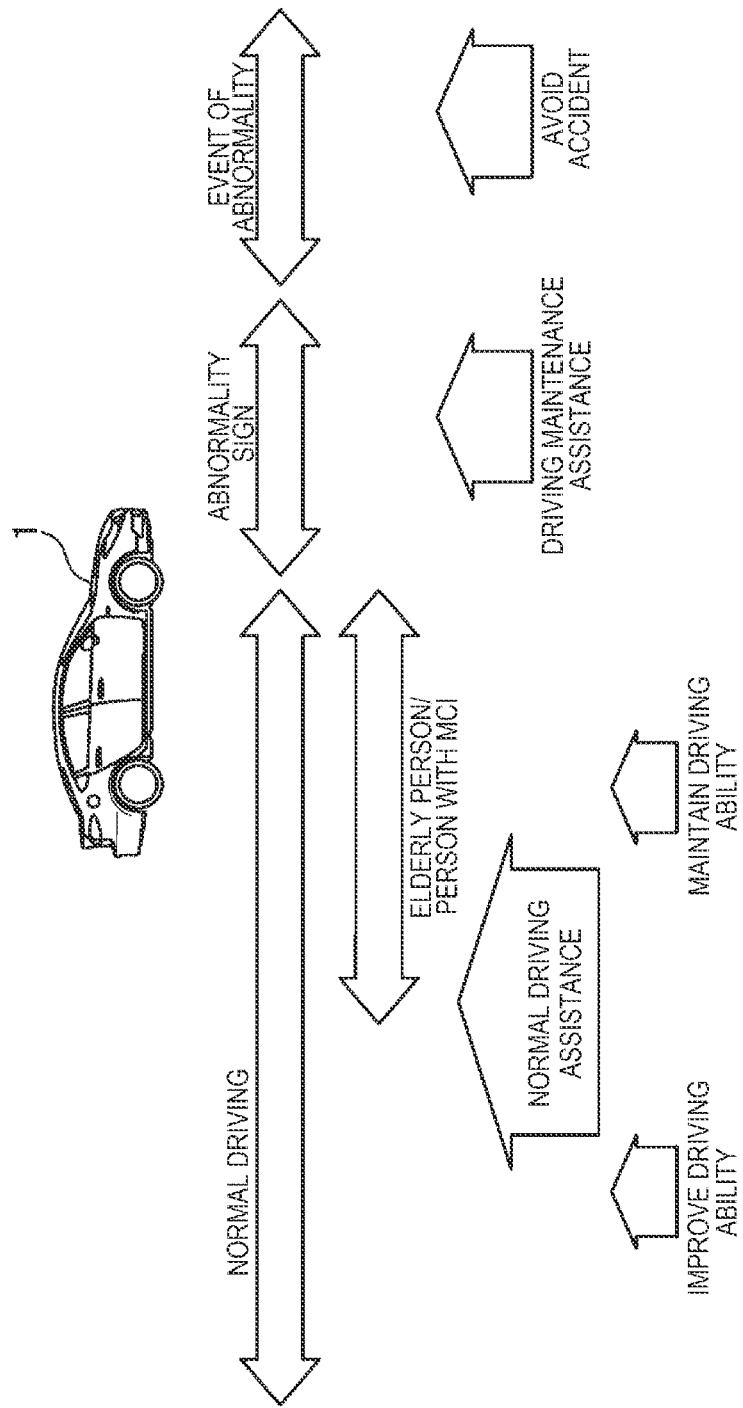
FIG. 1 is an explanatory view of vehicle control in an embodiment.

First, a description will be made on an overview of vehicle control that is provided by the vehicle control apparatus according to the embodiment of the present invention with reference to FIG. 1. FIG. 1 is an explanatory view of the vehicle control.

A vehicle control apparatus 100 (see FIG. 2) in this embodiment is configured on premise that a driver proactively performs a vehicle operation of a vehicle 1. Accordingly, the vehicle control apparatus 100 assists with the vehicle operation of the vehicle 1 in an appropriate level according to the driver's condition. In other words, in this embodiment, in principle, driving assistance control of the vehicle 1 is provided to fill a gap between the vehicle operation that the driver desires to perform and the vehicle operation that the driver can perform. For example, the driver's reduced driving function is primarily assisted. Furthermore, the vehicle control apparatus 100 is configured to automatically switch the vehicle 1 to automated driving control at a specified time.

More specifically, in the case where the driver has normal driving ability, the vehicle control apparatus 100 intervenes in the vehicle operation only at a particular time to execute the driving assistance control (automatic acceleration, automatic braking, automatic steering, or the like). Examples of the particular time are a time when the driver's driving ability is temporarily reduced (for example, due to fatigue or drowsiness) and a time when travel environment is relatively difficult (for example, a surrounding traffic condition is complicated, a road shape is complicated, or surrounding environment is dark). In the case where the driving ability of the driver (for example, an elderly person or a person with MCI) is partially reduced (for example, a lack of muscle strength to operate a steering wheel), the vehicle control apparatus 100 compensates for the reduced driving ability. In addition, the vehicle control apparatus 100 executes the driving assistance control to maintain or recover the reduced driving ability or to further improve the driving ability.

Meanwhile, in the case where such an abnormality sign is detected that the driver's conscious level or driving ability is reduced rapidly or over a specified period (several minutes to several tens of minutes) (for example, at onset of an acute illness or when a drowsiness level is high), the vehicle control apparatus 100 executes the driving assistance control to maintain safe travel. In an event of abnormality in which the driver loses consciousness or the driving ability, in order to avoid occurrence of an accident, the vehicle control apparatus 100 executes the automated driving control and also executes processing to notify outside of an emergency situation.

Figure 2:
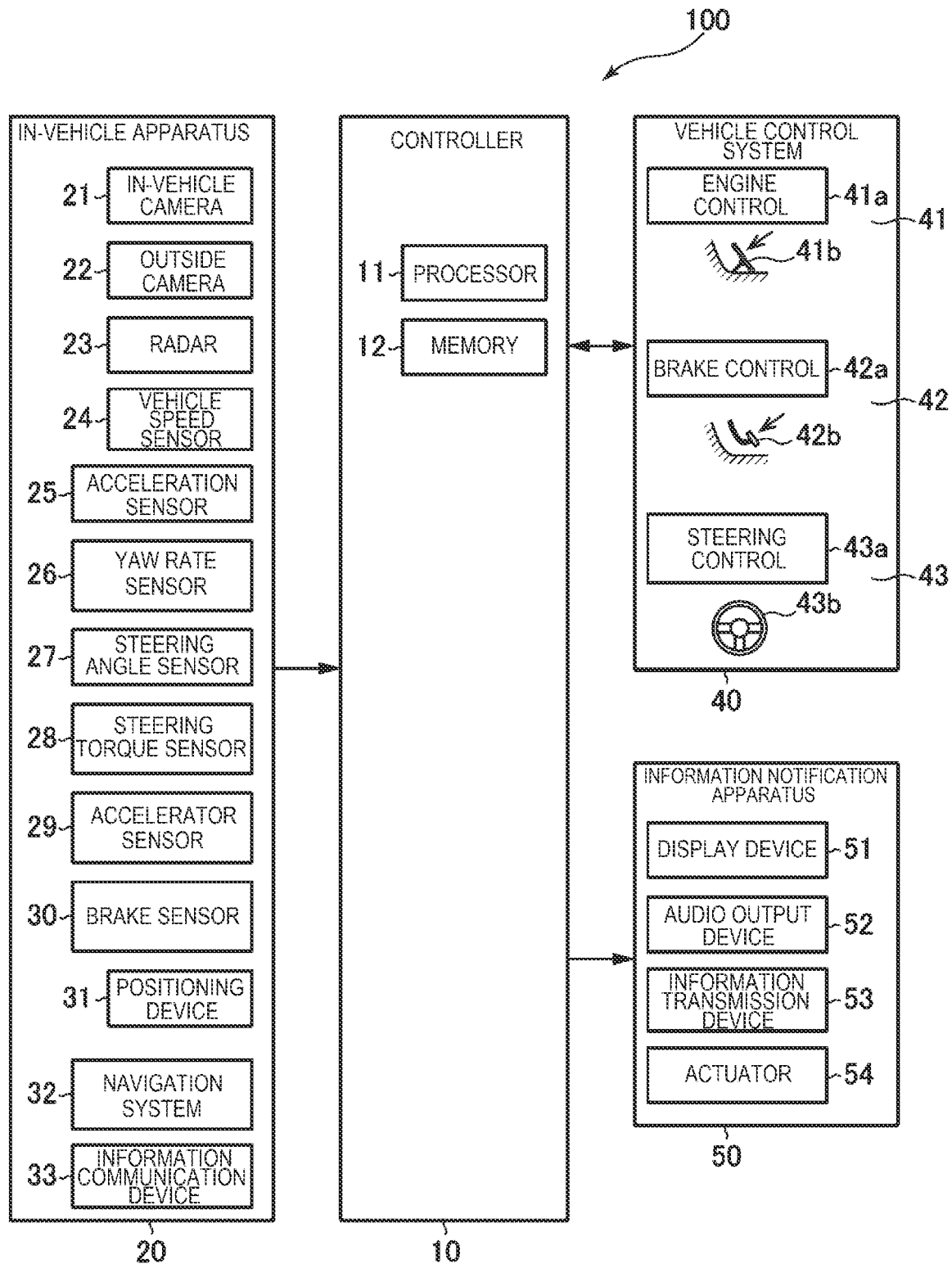
FIG. 2 is a block diagram of a vehicle control apparatus in the embodiment.

Next, a description will be made on a configuration of the vehicle control apparatus according to the embodiment of the present invention with reference to FIG. 2. FIG. 2 is a block diagram of the vehicle control apparatus. As illustrated in FIG. 2, the vehicle control apparatus 100 has, as main components, a controller 10 such as an electronic control unit (ECU), an in-vehicle apparatus 20, a vehicle control system 40, and an information notification apparatus 50.

The in-vehicle apparatus 20 includes an in-vehicle camera 21, an outside camera 22, a radar 23, and plural vehicle behavior sensors (a vehicle speed sensor 24, an acceleration sensor 25, a yaw rate sensor 26) to detect behavior of the vehicle 1, plural operation detection sensors (a steering wheel angle sensor 27, a steering torque sensor 28, an accelerator operation amount sensor 29, a brake depression amount sensor 30) to detect the driver's operation, a positioning device 31, a navigation system 32, and an information communication device 33.

The vehicle control system 40 includes an engine control system 41, a brake control system 42, and a steering control system 43 that respectively correspond to a running function, a stopping function, and a turning function of the vehicle. The information notification apparatus 50 includes a display device 51, an audio output device 52, an information transmission device 53, and plural actuators 54.

The controller 10 is constructed of a computer device that includes: a processor 11; memory 12 that stores various programs executed by the processor 11 and data; an input/output device; and the like. The controller 10 is configured to output a control signal for executing the vehicle control (the driving assistance control and the automated driving control) to the vehicle control system 40 and the information notification apparatus 50 on the basis of a signal received from the in-vehicle apparatus 20. As used herein 'computer' refers to circuitry that may be configured via the execution of computer readable instructions, and the circuitry may include one or more local processors (e.g., CPU's), and/or one or more remote processors, such as a cloud computing resource, or any combination thereof.

For example, the present technology can be configured as a form of cloud computing in which one function is shared in cooperation for processing among a plurality of devices via a network. Also, the present technology can be configured as a form of a server or IP converter in a hospital in which one function is shared in cooperation for processing among a plurality of devices via a network.

The in-vehicle camera 21 captures an image of the driver of the vehicle 1 and outputs image information. Based on this image information, the controller 10 particularly determines a facial expression and an upper body posture of the driver. In addition to a visible camera, the in-vehicle camera 21 may include a plurality of cameras and may detect wavelength ranges outside the visible region, e.g., infrared, ultraviolet, and so forth.

The outside camera 22 captures an image around the vehicle 1 (typically, front of the vehicle 1) and outputs image information. Based on this image information, the controller 10 identifies a target object and a position thereof on the outside of the vehicle. The target objects at least include a traffic participant and a boundary of a travel road. More specifically, the target objects include surrounding moving bodies (a vehicle, a pedestrian, and the like) and immobile structures (an obstacle, a parked vehicle, the travel road, a lane marking, a stop line, a traffic signal, a traffic sign, an intersection, and the like). In addition to a visible camera, the outside camera 22 may include a plurality of cameras and may detect wavelength ranges outside the visible region, e.g., infrared, ultraviolet, and so forth.

The radar 23 measures the position and a speed of the target object that exists around the vehicle 1 (typically, in front of the vehicle 1). For example, as the radar 23, a millimeter-wave radar, a laser radar (LIDAR), an ultrasonic sensor, or the like can be used.

The vehicle speed sensor 24 detects a speed (a vehicle speed) of the vehicle 1. The acceleration sensor 25 detects acceleration of the vehicle 1. The yaw rate sensor 26 detects a yaw rate generated to the vehicle 1. The steering wheel angle sensor 27 detects a rotation angle (a steering wheel angle) of a steering wheel 43*b* of the vehicle 1. The steering torque sensor 28 detects rotational torque that is associated with rotation of the steering wheel 43*b*. The accelerator operation amount sensor 29 detects a depression amount of an accelerator pedal 41*b*. The brake depression amount sensor 30 detects a depression amount of a brake pedal 42*b*.

The positioning device 31 includes a GPS receiver and/or a gyroscope sensor, and detects a position of the vehicle 1 (current vehicle position information). The navigation system 32 stores map information therein and can provide the map information to the controller 10. The controller 10 can calculate an entire travel route (including a travel lane, the intersection, the traffic signal, and the like) to a destination on the basis of the map information and the current vehicle position information.

The information communication device 33 communicates with an external communication device. For example, the information communication device 33 performs inter-vehicular communication with another vehicle and road-vehicle communication with an external communication device, receives various pieces of driving information and traffic information (traffic jam information, speed limit information, and the like), and provides the information to the controller 10.

The engine control system 41 controls drive power of an engine system (an internal combustion engine, an electric motor, or the like) of the vehicle 1. The controller 10 drives the engine system by sending a control signal to an engine controller 41*a* on the basis of input from the accelerator pedal 41*b*, and can thereby accelerate or decelerate the vehicle 1.

The brake control system 42 controls drive power of a brake system of the vehicle 1. For example, the brake control system 42 includes brake actuators such as a hydraulic pump and a valve unit. The controller 10 drives the brake system by sending a control signal to a brake controller 42*a* on the basis of input from the brake pedal 42*b*, and can thereby decelerate the vehicle 1.

The steering control system 43 controls drive power of a steering system of the vehicle 1. The steering control system 43 includes an electric motor for an electric power steering system, and the like, for example. The controller 10 drives the steering system by sending a control signal to a steering controller 43*a* on the basis of input from the steering wheel 43*b*, and can thereby change an advancing direction of the vehicle 1.

The display device 51 can visually display assistance information (visual information) for assisting the driver with the vehicle operation in a display area. The display device 51 may be a heads-up display (HUD) or a liquid-crystal display (LCD). The display area corresponds to size of an entire or partial front windshield of the vehicle 1, and the assistance information is displayed in the driver's field of view.

The audio output device 52 is a speaker, for example, and can provide the assistance information (auditory information) for assisting the driver with the vehicle operation.

The information transmission device 53 can transmit information on driving assistance to an external information communication device (for example, the driver's mobile information terminal).

The actuators 54 include an electric motor, a gear mechanism, and the like. The plural actuators 54 are configured to move each of plural operation sections to be operated at the time when the driver drives the vehicle 1 (for example, the accelerator pedal 41*b*, the brake pedal 42*b*, and the steering wheel 43*b*) in an operation direction without input by the driver. The controller 10 outputs a control signal to each of the actuators 54 and can thereby cause the corresponding operation section to demonstrate desired behavior.

The vehicle control system (for example, the engine control system, the brake control system, and the steering control system) in this embodiment is configured to be actuated by a drive-by-wire method. In addition, the vehicle control system in this embodiment is configured that the operation input from the operation section is transmitted as a control signal via the controller 10, and a drive unit corresponding to the operation section receives the control signal and is driven on the basis of the control signal. Thus, the controller 10 can output the control signal to the drive unit independently of movement of the operation section by the actuator 54.

Figure 3:
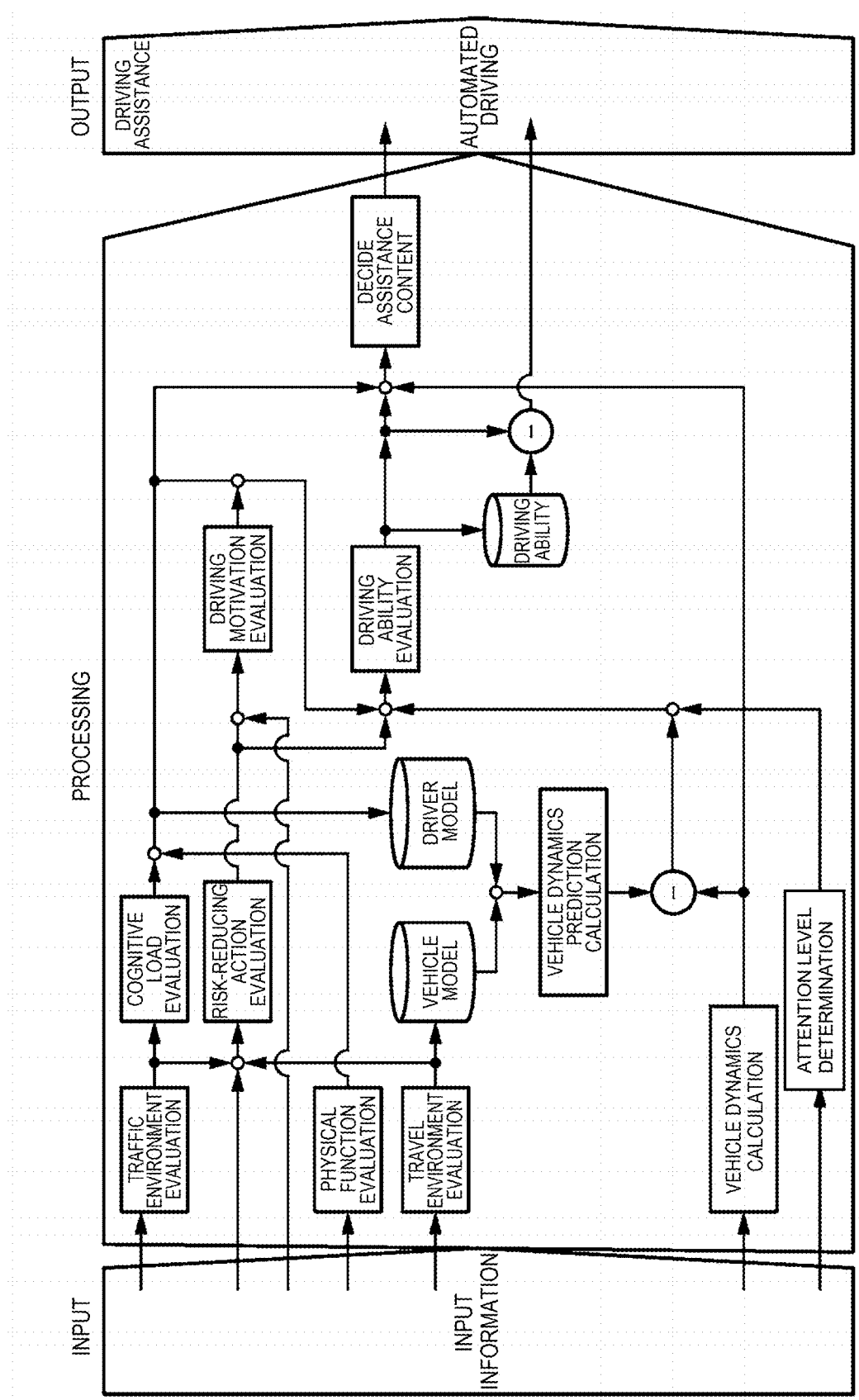
FIG. 3 is an explanatory view illustrating a processing procedure by the vehicle control apparatus in the embodiment.

Next, a description will be made on a processing procedure by the vehicle control apparatus according to the embodiment of the present invention with reference to FIG. 3. FIG. 3 is an explanatory view illustrating the processing procedure by the vehicle control apparatus. More specifically, FIG. 3 illustrates that the controller 10 processes input information from the in-vehicle apparatus 20 to provide various types of the vehicle control (the driving assistance control and the automated driving control) by using the vehicle control system 40 and the information notification apparatus 50.

Contents of the vehicle control are an advanced driver-assistance system (ADAS), the automatic acceleration, the automatic braking, the automatic steering, automated vehicle attitude stability control, and automated driving (level 3 or higher). The ADAS at least includes assistance functions for following a preceding vehicle, preventing a collision with the preceding vehicle, preventing lane departure, and the like (automatic entry avoidance control). The automated vehicle attitude stability control is control to stabilize a posture of the vehicle 1, that vehicle dynamics (a pitch, a roll, and a yaw) and to prevent sideslip, rollover, and the like.

The in-vehicle apparatus 20 continuously transmits the acquired information to the controller 10. Based on the acquired information, the controller 10 performs the following calculations or makes the following evaluations.

The controller 10 evaluates traffic environment around the vehicle 1 on the basis of the input information from, the outside camera 22, the radar 23, the positioning device 31, the navigation system 32 (the map information), and the like (traffic environment evaluation). More specifically, the controller 10 calculates the position, a speed, and the like of the target object (the vehicle, the pedestrian, a border line, a guard rail, the stop line, the traffic sign, or the like) around the vehicle 1.

In addition, the controller 10 evaluates a physical function of the driver on the basis of information from the steering wheel angle sensor 27, the steering torque sensor 28, the brake depression amount sensor 30, the in-vehicle camera 21, and the like (physical function evaluation). More specifically, the controller 10 estimates levels of the driver's physical functions to operate the operation section with an appropriate operation amount and at an appropriate operation speed and to visually capture visual stimulation on the outside of the vehicle. Whether the driver operates the operation section with the appropriate operation amount and at appropriate operation speed is evaluated by a difference between a combination of the operation amount and the operation speed (the steering wheel angle, a steering angular velocity, the depression amount, a depression speed, or a brake hydraulic pressure of the brake pedal 42*b*, or the like) actually input by the driver via the operation section and a combination of a target operation amount and a target operation speed at the time of traveling on a target travel route. Based on a driving request (the destination and the like), the target travel route is calculated by using results of the traffic environment evaluation, a travel environment evaluation, the physical function evaluation, and the like such that the vehicle 1 can travel safely and efficiently.

The controller 10 evaluates travel environment around the vehicle 1 on the basis of the information from the outside camera 22, the vehicle speed sensor 24, the acceleration sensor 25, the positioning device 31, and the like (the travel environment evaluation). More specifically, the controller 10 estimates physical quantities (for example, a curve radius and a road surface friction coefficient of the travel road) that affect the vehicle dynamics.

In addition, the controller 10 calculates the current vehicle dynamics of the vehicle 1 on the basis of the information from the vehicle speed sensor 24, the acceleration sensor 25, the yaw rate sensor 26, and the like (vehicle dynamics calculation). The vehicle dynamics include the speed, the acceleration, the yaw rate, three-axis rotational moment (pitch, yaw, and roll), and the like.

The controller 10 determines the driver's attention level on the basis of the image information from the in-vehicle camera 21 (arousal level determination). For example, the attention level is evaluated by opening amounts of the driver's eyes and/or mouth and by a position or the posture of the driver's upper body. For example, the attention level can be evaluated in four levels (zero, low, moderate, and high attention level).

The controller 10 determines whether there is a predicted risk in the traffic environment evaluation and the travel environment evaluation. The predicted risks include a traffic risk due to the traffic environment (for example, a collision of the vehicle 1 with the other vehicle) and a travel risk due to the travel environment affecting the vehicle dynamics (for example, spinning on a curved road). Then, the controller 10 evaluates risk avoidance action taken by the driver in response to this predicted risk on the basis of the information from the in-vehicle apparatus 20, the in-vehicle camera 21, and the like (risk avoidance action evaluation).

The risks include a vehicle accident, such as the collision of the vehicle 1, and states where postural stability of the vehicle 1 is lost or reduced (spinning, overturning, and the like). Risk objects causing such a risk include the traffic participants (the other vehicle, the pedestrian, and the like), the guard rail, the border line, the traffic signal (a red light), the stop line, and the like. The risk objects further include risk-generating portions of the travel road (a clipping point on the curved road, and the like). Each of these target objects becomes the risk object in such a circumstance where the respective object possibly poses the risk in the near future (for example, within a specified period such as 10 seconds) in the case where the current vehicle behavior (the vehicle dynamics) continues. The risk avoidance action is action taken by the driver in response to the predicted risk and, in particular, the vehicle operation (the acceleration, braking, and/or steering) that is performed to reduce a probability of occurrence of the predicted risk. For example, in the case where the predicted routes of the vehicle 1 and the other vehicle intersect and the collision between these vehicles is predicted, the risk avoidance action is the vehicle operation to reduce a collision probability or the vehicle operation to set the closest distance between the vehicle 1 and the other vehicle to be equal to or longer than a specified distance. Furthermore, the target object that is unlikely to pose the risk at a current time point but should be perceived during travel and the target object that possibly poses the risk in the future beyond a specified period may be included as the risk objects.

In addition, the risk avoidance action includes such action that the driver perceives the risk object (for example, the other vehicle with a collision possibility or a location near the clipping point on the curved road) before operating the operation section. For example, the risk avoidance action includes shifting of the driver's sightline to the risk object and shifting of the driver's posture to handle the risk (that is, perception of the risk object by the driver) on the basis of the image information from the in-vehicle camera 21.

The controller 10 evaluates the driver's current cognitive load on the basis of the result of the traffic environment evaluation (cognitive load evaluation). For example, the controller 10 evaluates that, according to the vehicle speed, the driver's cognitive load is greater as the number of the target objects within a specified distance from the vehicle 1 is increased. For example, the cognitive load can be evaluated in three levels (low, moderate, and high). In addition, the controller 10 may analyze and learn the driver's cognitive ability level on the basis of information on the vehicle operation by the driver and the driver's sightline direction, and may then update the driver's cognitive ability level. In this case, the cognitive load evaluation can be calculated as a ratio of a magnitude of the current cognitive load to the driver's cognitive ability level.

The controller 10 evaluates the driver's current driving motivation (driving motivation evaluation). The driving motivation is affected by the driver's physical and mental state and an external factor. For example, the driving motivation tends to be reduced by factors such as the driver's fatigue, simplicity and complexity of the traffic environment and the travel environment (for example, a straight road with light traffic), and the like. The controller 10 evaluates the driving motivation from the driver's image (the facial expression, the driving posture, and the like) that is based on the image information from the in-vehicle camera 21. The controller 10 determines that the driving motivation is low, for example, when detecting a narrow field of view, frequent yawing, a high frequency of looking at a position other than the front, the driver's sightline not being directed to the attracting target object or a rear-view mirror, or the like. In addition, the controller 10 evaluates the driving motivation from the vehicle operation for the operation section on the basis of detected information by the in-vehicle apparatus 20. For example, when the controller 10 detects a delay in the driver's actual vehicle operation from an estimated vehicle operation by a driver model, for example, the controller 10 determines that the driving motivation is low. For example, the driving motivation can be evaluated in three levels (low, moderate, and high).

The controller 10 stores a vehicle model, which defines physical motion of the vehicle 1, in a storage section. The vehicle model represents a relationship between specifications of the vehicle 1 (mass, wheelbase, and the like) and physical variations (the speed, the acceleration, the steering angle, and the like) by an equation of motion. The result of the travel environment evaluation (for example, the road surface friction coefficient) can also be applied to the vehicle model.

The controller 10 stores a driver model of the driver who drives the vehicle 1 in the storage section. The controller 10 analyzes and learns the driver's operation characteristic on the basis of the input information from the in-vehicle apparatus 20, and constantly updates the driver model. The driver model represents the driver's operation characteristic and includes an operation amount, a reaction delay time (time constant), and the like for a particular operation under a certain condition. The result of the cognitive load evaluation (the magnitude of the cognitive load) and the result of the physical function evaluation can also be applied to the driver model. For example, in a situation where the cognitive load is high, the driver model is corrected to reduce the driver's operating ability. Meanwhile, in the case where it is determined, from the result of the physical function evaluation, that a depression force or arm strength is low, such a determination is reflected in the time constant related to the operation amount and the operation speed of the operation section. By using the driver model, the controller 10 can predict the driver's operation. The controller 10 also stores an ideal driver model, which represents the ideal operation characteristic of the driver with the high driving ability, in the storage section, and thus can also predict the ideal operation.

The controller 10 applies the input information from the in-vehicle apparatus 20 to the vehicle model and the driver model, and can thereby calculate the vehicle dynamics that is predicted to be generated in a period from the current time point to the near future (vehicle dynamics prediction calculation). In other words, by inputting current conditions (the traffic environment, the travel environment, the cognitive load, and the physical function) into the driver model and the vehicle model, the controller 10 can predict the vehicle operation (a type of the operation, the operation amount, operation timing, and the like) to be performed by the driver in a specified period (for example, 10 seconds) from the current time point, and can calculate predicted vehicle dynamics to be generated by the predicted vehicle operation.

Furthermore, the controller 10 makes a driving ability evaluation. The driving ability represents a measure of the driver's ability to avoid the various risks. The controller 10 evaluates or calculates the driving ability against the risk on the basis of the result of the risk avoidance action evaluation (the risk avoidance action taken by the driver), a difference between the predicted vehicle dynamics and the actual vehicle dynamics, the result of the cognitive load evaluation (the magnitude of the cognitive load), the result of the driving motivation evaluation, and the result of the attention level determination. For example, the driving ability against the risk can be a required risk avoidance time that is required by the driver to avoid the predicted risk. The required risk avoidance time may be a time from initiation of the risk avoidance action to disappearance of the predicted risk or a required time from the driver's perception of the risk to completion of the risk avoidance action. In this case, in the case where the driving ability is evaluated as low, the required risk avoidance time is output as a large value. Here, in the case where the driving motivation or the attention level is low, the driving ability is evaluated as low.

For example, the controller 10 uses the driver model to calculate a predictive travel route of the vehicle 1 at a future time point of a case where it is assumed that the current vehicle behavior continues only for a specified time. When the specified time reaches a certain time, the risk can no longer be avoided on the predictive travel route at the time point. Then, a time until occurrence of the risk in the predictive travel route, which is calculated at this time, (a risk margin time) may be set as the required risk avoidance time.

The controller 10 can update driving ability data by using the calculated driving ability evaluation. The driver's driving ability changes over time. For example, the driving ability of a novice driver tends to be improved while the driving ability of the elderly person tends to be reduced. Plural driving ability data sets may be provided in a manner to correspond to plural evaluation periods. For example, the driving ability data sets in a short term (one to six months before the current time point), a medium term (three to nine months before the current time point), and a long term (one to two years before the current time point) can be created.

The controller 10 decides the content of the driving assistance on the basis of the current vehicle dynamics, the result of the driving ability evaluation (the current driving ability), the result of the cognitive load evaluation, and the result of the physical function evaluation. The controller 10 executes the driving assistance control and the automated driving control on the basis of this calculation. During normal driving, the driver (for example, the novice driver or the elderly person) exerts driving performance by using his/her own driving functions (a perceptual function, a determination function, and the physical function). However, in the case where the driver cannot avoid the predicted risk (that is, in the case where the driver's driving performance does not satisfy the required driving ability to avoid the predicted risk), the controller 10 executes the driving assistance control to assist with the insufficient driving ability. In the event of abnormality (for example, loss of consciousness), for example, the automated driving control is executed.

In addition, the controller 10 compares the result of the driving ability evaluation (the current driving ability against the predicted risk) to the driving ability data. Then, in the case where the current driving ability is lower than the driving ability in the past, the controller 10 provides assistance (including the automated driving) to compensate for the reduced driving ability. When the driver's attention level is moderate (for example, the mild drowsiness), the controller 10 executes processing to wake the driver (for example, blowing cool air to the driver). When the driver's attention level is low (for example, the severe drowsiness or the loss of consciousness), the controller 10 executes the automated driving.

Figure 4:
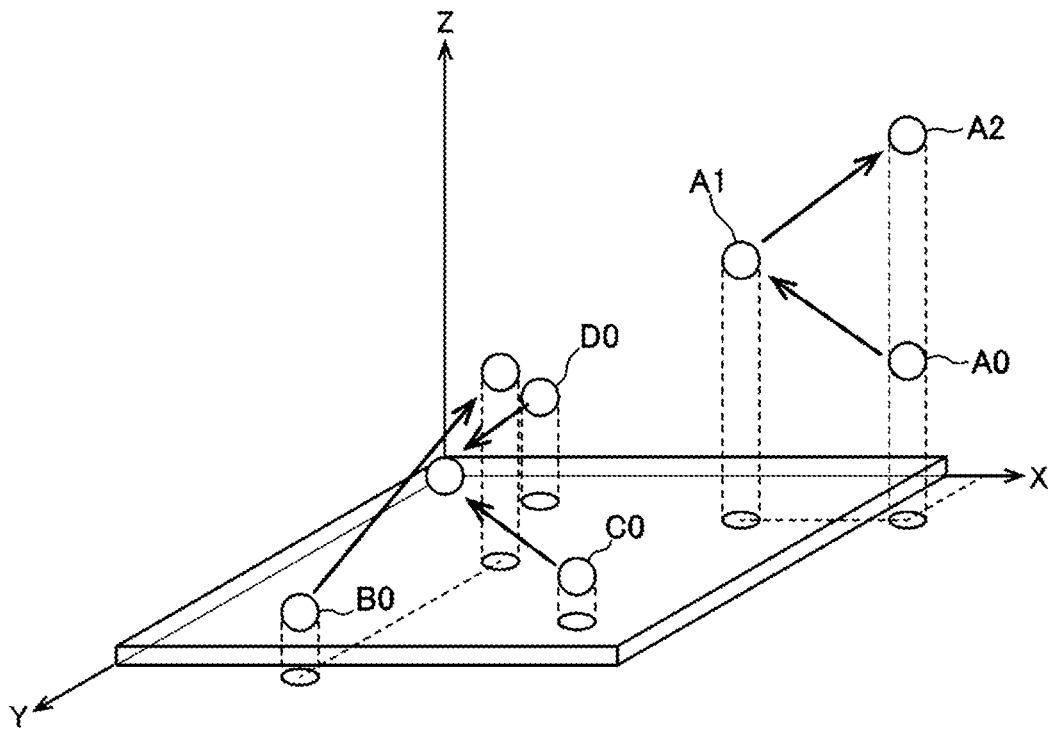
FIG. 4 is a graph illustrating a relationship between a driver's driving ability and each of a traffic risk and a travel risk in the embodiment.

Next, a description will be made on a relationship between the driver's driving ability and the risk in the embodiment of the present invention. FIG. 4 is a graph illustrating a relationship between the driver's driving ability and each of the traffic risk and the travel risk. In FIG. 4, the driving ability is increased and the risk is increased as moving away from a point of origin. In this embodiment, the risks are classified into two different types of the risks that are: the traffic risk due to the traffic environment (a Y-axis); and the travel risk due to the travel environment (an X-axis).

The traffic risk is the risk that is associated with complexity of surrounding traffic, and more specifically, such a risk that the vehicle 1 enters a risk area. Entry to the risk area means a contact or a collision of the vehicle 1 with the traffic participant therearound (the vehicle, the pedestrian, or the like), or a contact of the vehicle 1 with or crossing of the boundary of the travel road (the border line, the guard rail, the stop line, or the like) by the vehicle 1. Meanwhile, the travel risk is the risk that is associated with the vehicle dynamics, and more specifically, spinning or overturning due to a reduction of the postural stability of the vehicle 1. In this embodiment, each of these traffic risk and travel risk can be set as an estimated time until the occurrence of the respective risk (the risk margin time). In this case, as the risk margin time (a traffic risk score or a travel risk score) is reduced, a magnitude of the risk is increased.

The driving ability (a Z-axis) includes the driver's driving skill (basic driving ability) and short-term driving ability. The basic driving ability is the driving skill that is calculated in consideration of the physical function and a cognitive function, and can vary in a long term. The short-term driving ability is a correction factor (or a noise factor) that is calculated on the basis of the attention level and the driving motivation, and can vary in a short term. Thus, the driver's current driving ability score is calculated from a score representing a magnitude of the basic driving ability and a score representing a magnitude of the short-term driving ability. When the specific traffic risk and/or the specific travel risk is predicted, a basic driving ability score can be set as the required risk avoidance time calculated for these predicted risks. In this case, the driving ability is increased as the required risk avoidance time (the driving ability score (second)) is reduced.

Meanwhile, the short-term driving ability can be a coefficient k, by which the basic driving ability score is multiplied, or a time t which is added to the basic driving ability score. For example, the coefficient k can include a product of a coefficient k1, which is based on the attention level, and a coefficient k2, which is based on the driving motivation. The coefficient k1 is set according to the result of the attention level determination (zero, low, moderate, or high) (for example, in an order of infinity, 1.5, 1.2, and 1.0). The coefficient k2 is set according to the result of the driving motivation evaluation (low, moderate, or high) (for example, in an order of 1.5, 1.2, and 1.0). The added time t can include a sum of a time t1, which is based on the attention level, and a time t2, which is based on the driving motivation. The time t1 is set according to the result of the attention level determination (zero, low, moderate, or high) (for example, in an order of infinity, two seconds, one second, and zero second). The time t2 is set according to the result of the driving motivation evaluation (low, moderate, or high) (for example, in an order of two seconds, one second, and zero second).

In the case where the travel risk is high (see a point A0), the driver's driving motivation is reduced, and the current driving ability is further reduced (the required risk avoidance time is extended). In the case where the vehicle control intervenes at this time, the travel risk is substantially reduced (see a point A1), the driving motivation is recovered, and the current driving ability is increased. By repeating a similar situation, the driver's experience is increased, and the driving ability itself is improved. As a result, the similar travel risk can be avoided without the vehicle control (see a point A2). In this way, in this embodiment, the driver can improve the driving ability. Similarly, also in the case where the traffic risk is high (see a point B0), the driving ability can be improved. On the other hand, in the case where the risk is high and the current driving ability is extremely low (see a point C0, for example, the loss of consciousness), or in the case where the risk is not high but the current driving ability is extremely low (see a point D0, for example, the travel road is dull and the driving motivation is low), in this embodiment, the vehicle 1 is subjected to the automated driving control.

In this embodiment, the risks are classified into the two different types of the risks that are the traffic risk and the travel risk, and the vehicle control for avoiding these risks also includes different types of the vehicle control. In other words, the vehicle control related to the traffic risk is the automatic entry avoidance control to avoid the entry of the vehicle 1 to the risk area (the traffic participant or the boundary of the travel road), and examples thereof are the preceding vehicle following control, forward collision prevention control, and lane keeping control. Meanwhile, the vehicle control related to the travel risk is the automated vehicle attitude stability control of the vehicle 1, and examples thereof are sideslip prevention control and rollover prevention control. By classifying the risks as described, the driver recognizes the type of the insufficient driving skill from the type of the vehicle control that intervenes when encountering the risk, and thus can easily improve the driving skill.

Figure 5:
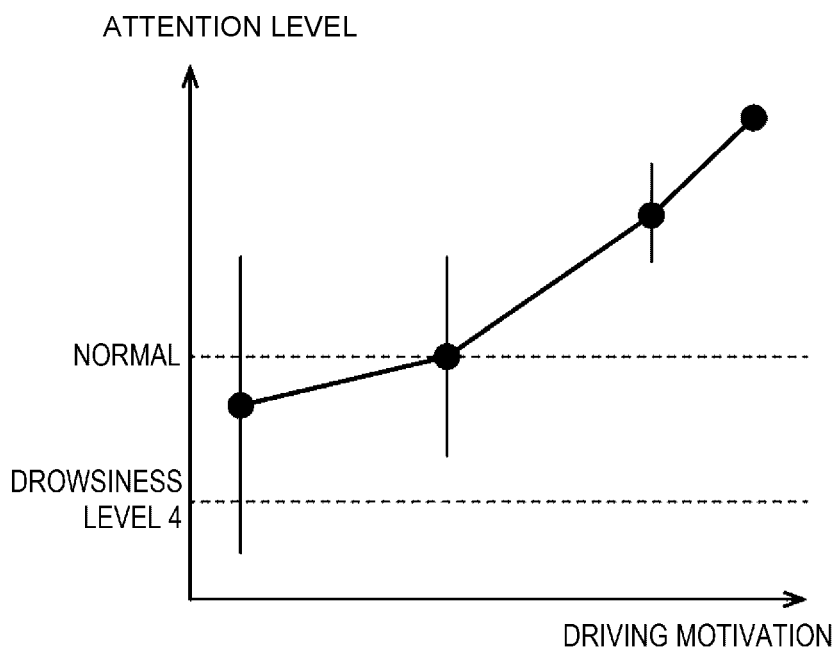
FIG. 5 is a graph illustrating a relationship between driving motivation and an attention level in the embodiment.

Next, a description will be made on a relationship between the driving motivation and the attention level in this embodiment. FIG. 5 is a graph illustrating the relationship between the driver's driving ability and the attention level, and FIG. 6 is a table illustrating the driver's condition according to the driving motivation and the attention level. According to FIG. 5, the attention level tends to be increased as the driving motivation is increased. In addition, a variation in the attention level is reduced as the driving motivation is increased. That is, in a state where the driving motivation is high, the attention level is also high. However, when the driving motivation is low, variation in the attention level is large. FIG. 6 illustrates an exemplary driver's condition and an exemplary vehicle operation that correspond to each of the conditions of the driving motivation and the arousal level. Referring to FIG. 6, the controller 10 can estimate the driving motivation and the attention level from the driver's facial expression, driving posture, or vehicle operation.

Figure 7:
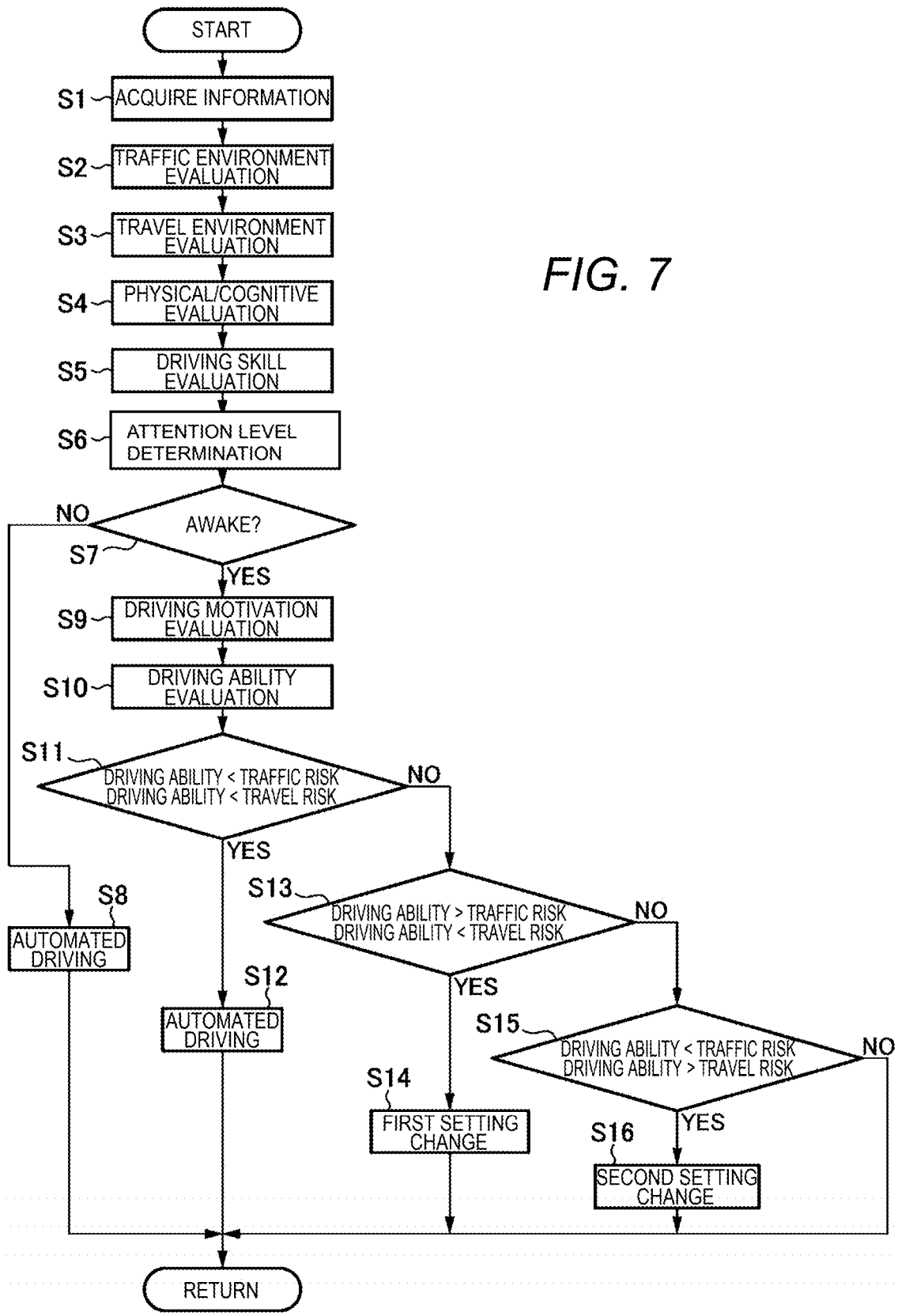
FIG. 7 is a flowchart of driving assistance control in the embodiment.

Next, a description will be made on a processing flow of the driving assistance control by the vehicle control apparatus according to the embodiment of the present invention. FIG. 7 is a flowchart of the driving assistance control. After receiving the driving request (the destination and the like) from the driver or the outside via an input device (for example, the navigation system 32 or the information communication device 33), the controller 10 repeatedly executes the driving assistance control (for example, every 0.1 second).

First, as illustrated in FIG. 7, the controller 10 acquires the information from the in-vehicle apparatus 20 every specified time (for example, every 0.1 second) (S1). Based on the acquired information, the controller 10 executes processing such as the traffic environment evaluation (S2), the travel environment evaluation (S3), and the physical function evaluation and the cognitive function evaluation (S4). In addition, based on the acquired information, the controller 10 executes the risk avoidance action evaluation and the vehicle dynamics calculation.

The controller 10 estimates a magnitude of the traffic risk in the traffic environment evaluation (S2), and estimates a magnitude of the travel risk in the travel environment evaluation (S3). More specifically, based on the traffic environment evaluation, the travel environment evaluation, and the like, the controller 10 determines whether the current vehicle behavior (vehicle dynamics) possibly poses the risk within a specified time. The controller 10 calculates a time from the current time point to the occurrence of the predicted risk (the traffic risk or the travel risk) (that is, a risk margin time TTR (time to risk)). In this embodiment, the risk margin time TTR corresponds to the traffic risk score or the travel risk score. In the case where the risk margin time TTR is equal to or shorter than the specified time (for example, 10 seconds), it is determined that the predicted risk is present. The risk margin time TTR is an estimated time until the vehicle 1 enters the risk area in the case where the vehicle maintains the current vehicle behavior (the vehicle dynamics such as the speed and the acceleration). The entry to the risk area means the collision of the vehicle 1 with the other vehicle or the position, at which spinning of the vehicle 1 is predicted, in the curved road, for example. In the case where the predicted risk is not detected, the processing may be terminated.

Then, the controller 10 performs the calculation of the target travel route, and the like on the basis of the acquired information and the driving request. The target travel route includes: a target travel path (positional information at plural positions) in a specified period (for example, 10 seconds) from the current time point; the speed at each position on the path; and the like. By using the driving request and the results of the traffic environment evaluation, the travel environment evaluation, the physical function evaluation, and the like, the controller 10 calculates the target travel route with specified levels of safety and travel efficiency. The controller 10 can calculate the plural target travel routes, each of which satisfies a specified constraint condition (for example, that lateral acceleration is equal to or lower than a specified value). For example, in the case where the obstacle exists ahead of the vehicle 1, the controller 10 can set the plural target travel routes to avoid the obstacle. Here, even when the vehicle 1 moves away from the target travel route, the vehicle 1 can travel on another travel route. However, since the other travel route does not satisfy a specified standard, the travel efficiency and ride comfort thereon are poor.

Then, the controller 10 calculates target vehicle dynamics for travel on the target travel route. The target vehicle dynamics includes the speed, the acceleration, the yaw rate, the three-axis rotational moment (pitch, yaw, and roll), and the like at each of the positions on the target travel route. The target vehicle dynamics is a target control value that is used when the vehicle 1 executes the driving assistance control and the automated driving control. Plural types of the target vehicle dynamics (or the plural target control values) can be set in a manner to correspond to the plural target travel routes.

Furthermore, the controller 10 calculates an operation amount of a target vehicle operation (an accelerator operation amount, a brake depression amount, the steering wheel angle, or the like) that is a driving performance request for the driver and the vehicle 1 in order to achieve a physical quantity of the target vehicle dynamics at each of the positions on the target travel route, or calculates the control signal for the vehicle control system 40. The driving performance request with a specified range is set due to the plural target travel routes.

Then, the controller 10 estimates the driver's driving skill by using the results of the traffic environment evaluation, the travel environment evaluation, and the physical function evaluation, and the like (S5). In this embodiment, the driving skill is the ability to avoid the predicted risk, and more specifically, a required time to avoid the predicted risk (a required risk avoidance time TER). Accordingly, the controller 10 calculates the predictive travel route on the basis of the driver model. Then, based on this predictive travel route, the controller 10 calculates the required risk avoidance time TER. For example, in the case where the obstacle exists ahead of the vehicle 1, based on the driver model, the controller 10 predicts the vehicle operation to be performed by the driver in order to avoid the obstacle. Then, the controller 10 sets a time required for this avoidance vehicle operation as the required risk avoidance time TER.

Then, the controller 10 executes attention level determination processing (S6), and determines whether the attention level is lower than a specified threshold (S7). Alternatively, in step S6, it may be determined whether the current driving ability score, for which the attention level is taken into consideration, is higher than the specified threshold (or whether the driving ability is lower than a specified level). In this case, it is determined whether a score, which is acquired by correcting the driving skill score calculated in Step S5 with the coefficient k1 or t1 based on the attention level, is higher than the specified threshold.

If the attention level is lower than the specified threshold (S7: NO. The evaluation result of the attention level is "zero"), the driver is in a state of the loss of consciousness or in a state where the drowsiness level is extremely high. Accordingly, the controller 10 executes the automated driving (S8). On the other hand, if the attention level is equal to or higher than the specified threshold (the evaluation result of the attention level is "low", "moderate", or "high") (S7: YES), the controller 10 executes driver's driving motivation evaluation processing (S9), and further executes the driver's driving ability evaluation processing (S10). In the driving ability evaluation processing, the driving skill score (S5) is corrected on the basis of the driver's attention level (S6) and the driver's driving motivation (S9).

Then, the controller 10 determines whether the traffic risk and the travel risk can be avoided by the driver's current driving ability. First, if none of the traffic risk and the travel risk can be avoided by the current driving ability (S11: YES), controller 10 executes the automated driving (S12). In this case, the driving ability score is higher than the traffic risk score and the travel risk score.

Although the traffic risk and the travel risk are different types of the risks, the traffic risk and the travel risk can coexist in one situation. Examples of such a situation are a case of avoiding the obstacle on a snow-covered travel road and a case where the vehicle ahead brakes on a controlled-access highway. In any of these cases, the traffic risk of a collision with the obstacle or the vehicles ahead coexists with the travel risk of the unstable posture due to a slip. In such a case, the driving ability score is calculated for both of these risks, and each of the driving ability scores is compared to the respective risk score. If none of the traffic risk and the travel risk can be avoided (S11: YES), the vehicle 1 is switched to the automated driving in consideration of the safety.

If the traffic risk can be avoided by the current driving ability but the travel risk cannot be avoided by the current driving ability (S13: YES), the controller 10 executes first setting change processing so as to promptly execute the automated vehicle attitude stability control ("control 1") for stabilizing the posture of the vehicle 1 (S14). In this case, the driving ability score is lower than the traffic risk score but is higher than the travel risk score.

The execution of the automated vehicle attitude stability control is initiated when a specified condition is satisfied. An example of the specified condition is that a control parameter (one or plural) reaches a threshold for initiating the execution. The threshold is usually set to a default threshold. Examples of the control parameter are a slip rate, the vehicle speed, the yaw rate, and the lateral acceleration. At a time point of the processing in step S14, the control parameter has not reached the default threshold. Thus, the automated vehicle stability control has not been initiated.

In the processing in step S14 onward, in the case where the driver continues the current vehicle operation, the travel risk (for example, spinning) eventually occurs. However, since the specified condition is satisfied before reaching to the travel risk, the execution of the automated vehicle stability control is initiated.

In this embodiment, the first setting change processing is executed to change the threshold from the default threshold to an early initiation threshold such that the automated vehicle stability control is initiated promptly (S14). In other words, the execution of the automated vehicle stability control is normally initiated when the control parameter reaches the default threshold. However, after the first setting change processing (S14), the execution of the automated vehicle stability control is initiated when the control parameter reaches the early initiation threshold. After this travel risk no longer exists, the threshold value is set back to the default threshold.

Whether the automated vehicle stability control is executed after the processing in step S14 onward depends on the driver's actual vehicle operation. Unless the control parameter does not reach the early initiation threshold, the automated vehicle stability control is not executed. On the other hand, in the case where the control parameter reaches the early initiation threshold, the automated vehicle stability control is executed earlier than usual to stabilize the posture of the vehicle 1. In other words, in the case where the early initiation threshold is set, compared to the normal time, the automated vehicle stability control is executed in a state where the posture of the vehicle 1 is further stabilized.

When the execution of the automated vehicle stability control is initiated, the controller 10 uses the information notification apparatus 50 to notify the driver of intervention of the automated vehicle stability control. By acknowledging the intervention of the automated vehicle attitude stability control, the driver can learn that the operation amount and the operation timing of the vehicle operation performed by the driver in an unstable situation of the vehicle dynamics (for example, travel on the icy curved road) have been inappropriate. In this way, in a similar situation, the driver can improve his or her driving skill to prevent the intervention of the automated vehicle stability control. Furthermore, since improvement in the driving skill is reflected to the driver model, the driving ability score is improved.

If the travel risk can be avoided by the current driving ability but the traffic risk cannot be avoided by the current driving ability (S15: YES), the controller 10 executes second setting change processing so as to promptly execute the automatic entry avoidance control ("control 2") for avoiding the entry of the vehicle 1 to the risk area (S16). In this case, the driving ability score is lower than the travel risk score but is higher than the traffic risk score.

The execution of the automatic entry avoidance control is initiated when a specified condition is satisfied. An example of the specified condition is that a control parameter (one or plural) reaches a threshold for initiating the execution. The threshold is usually set to a default threshold. Examples of the control parameter are: an inter-vehicular distance between the preceding vehicle and the vehicle 1 in the case of automatic brake control (the automatic entry avoidance control); and a lateral distance from the vehicle 1 to the border line in the case of the lane keeping control (the automatic entry avoidance control). At a time point of the processing in step S16, the control parameter has not reached the default threshold. Thus, the automatic entry avoidance control has not been initiated.

In the processing in step S16 onward, in the case where the driver continues the current vehicle operation, the traffic risk (for example, the collision with the preceding vehicle or moving out of the border line) eventually occurs. However, since the specified condition is satisfied before reaching to the traffic risk, the execution of the automatic entry avoidance control is initiated.

In this embodiment, the second setting change processing is executed to change the threshold from the default threshold to the early initiation threshold such that the automatic entry avoidance control is initiated promptly (S16). In other words, the execution of the automatic entry avoidance control is normally initiated when the control parameter reaches the default threshold. However, after the second setting change processing (S16), the execution of the automatic entry avoidance control is initiated when the control parameter reaches the early initiation threshold. After this traffic risk no longer exists, the threshold value is set back to the default threshold.

For example, in the automatic brake control (the automatic entry avoidance control), the control parameter (the inter-vehicular distance between the preceding vehicle and the vehicle 1) has the default threshold of 2 m and the early initiation threshold of 3 m. In the lane keeping control (the automatic entry avoidance control), the control parameter (the lateral distance from the vehicle 1 to the border line) has the default threshold of 0.5 m and the early initiation threshold of 0.7 m.

In the processing in step S16 onward, whether the automatic entry avoidance control is executed depends on the driver's actual vehicle operation. Unless the control parameter does not reach the early initiation threshold, the automatic entry avoidance control is not executed. On the other hand, in the case where the control parameter reaches the early initiation threshold, the automatic entry avoidance control is executed earlier than usual to avoid the entry of the vehicle 1 to the risk area. In other words, when the early initiation threshold is set, sudden braking and sudden steering in the automatic entry avoidance control are suppressed compared to the normal time.

When the execution of the automatic entry avoidance control is initiated, the controller 10 uses the information notification apparatus 50 to notify the driver of intervention of the automatic entry avoidance control. By acknowledging the intervention of the automatic entry avoidance control, the driver can learn that the operation amount and the operation timing of the vehicle operation performed by the driver in a situation of entering the risk area have been inappropriate. In this way, in a similar situation, the driver can improve his or her driving skill to prevent the intervention of the automatic entry avoidance control. Furthermore, since the improvement in the driving skill is reflected to the driver model, the driving ability score is improved.

If the traffic risk and the travel risk can be avoided by the current driving ability (S15: NO), the controller 10 terminates the processing without executing the setting change processing. In this case, the driving ability score is lower than the traffic risk score and the travel risk score.

A description will hereinafter be made on operational effects of the vehicle control apparatus 100 according to the embodiment of the present invention.

The vehicle control apparatus 100 in this embodiment executes the driving assistance control for the vehicle 1 such that the vehicle 1 travels according to the traffic environment and the travel environment around the vehicle 1. The vehicle control apparatus 100 includes the controller 10 that calculates the target travel route on the basis of the traffic environment and the travel environment and can control the vehicle 1 such that the vehicle 1 travels on the target travel route. The controller 10 is configured to execute: traffic environment evaluation processing (S2) to estimate the traffic risk score that represents the magnitude of the traffic risk caused by the entry of the vehicle 1 to the risk area in the traffic environment, in the traffic environment evaluation processing (S2), the risk area including the traffic participant and/or the boundary of the travel road; travel environment evaluation processing (S3) to estimate the travel risk score that represents the magnitude of the travel risk in the travel environment, the travel risk destabilizing the posture of the vehicle 1; and the driving ability evaluation processing (S9) to estimate the driving ability score that represents a level of the driving ability for the driver of the vehicle 1 to avoid the traffic risk and the travel risk. The controller 10 executes the first setting change processing (S14) to change the threshold, with which the automated vehicle attitude stability control is initiated, so as to promptly execute the automated vehicle attitude stability control for stabilizing the posture of the vehicle 1 when determining, on the basis or the driving ability score and the travel risk score, that the travel risk cannot be avoided by the driving ability (S13: YES), executes the second setting change processing (S16) to change the threshold, with which the automatic entry avoidance control is initiated, so as to promptly execute the automatic entry avoidance control for avoiding the entry of the vehicle 1 to the risk area when determining, on the basis of the driving ability score and the traffic risk score, that the traffic risk is not avoided by the driving ability (S15: YES), and controls the vehicle 1 to travel on the target travel route when determining, on the basis of the driving ability score, the traffic risk score, and the travel risk score, that the traffic risk and the travel risk are not avoided by the driving ability (S11: YES) or when determining, on the bass of the driving ability score, that the driving ability is lower than the specified level (S7: NO).

In this embodiment that is configured as described above, the risks during the travel of the vehicle 1 are distinguished between the traffic risk that depends on the traffic environment and the travel risk that depends on the travel environment. Then, according to the risk that is estimated to be unavoidable by the driver's driving ability, the driving assistance control by the automatic entry avoidance control or the automated vehicle attitude stability control can intervene further promptly. In this way, in this embodiment, the appropriate driving assistance control can easily intervene in response to the driving ability in the lower level among the driver's driving ability corresponding to the two risks. In addition, in this embodiment, since the driving assistance control intervenes promptly in the state where the risk level of the vehicle 1 is low, the risk-avoidance vehicle operation by the driving assistance control becomes a relatively gentle operation, and thus the abrupt risk-avoidance vehicle operation is avoided. In this embodiment, through the prompt and gradual intervention of the driving assistance control, the driver can learn the situation (the surrounding environment and the vehicle operation by the driver) where the driving assistance control intervenes easily. In addition, the driver can improve the vehicle operation in a manner to prevent the intervention of the driving assistance control for the same type of the risk. Therefore, the driving ability in the low level can be improved in the long term.

In this embodiment, preferably, the controller 10 notifies the driver of the vehicle 1 that the automated vehicle attitude stability control and the automatic entry avoidance control are executed when the automated vehicle attitude stability control and the automatic entry avoidance control are executed. In this embodiment that is configured as described above, the driver can recognize the intervention of the driving assistance control by means of the notification.

In this embodiment, preferably, when the traffic risk and the travel risk no longer exist, the controller 10 sets back the thresholds, which have been changed in the first setting change processing and the second setting change processing, to the default thresholds of the vehicle. In this embodiment that is configured as described above, every time the risk occurs, the setting of the threshold for the driving assistance control can be changed on the basis of the current driving ability score and one of the traffic risk score and the travel risk score. Therefore, when the driver's driving ability is improved, the threshold is no longer changed from the default threshold, and freedom of the vehicle operation is increased as the driver's driving ability is increased.

In this embodiment, preferably, the driving ability scores include the basic driving ability score and the short-term driving ability score. The controller 10 preferably updates the driver model by learning the vehicle operation of the driver of the vehicle 1 and estimates the basic driving ability score on the basis of the driver model to avoid the traffic risk and the travel risk (S5). The controller 10 preferably estimates the short-term driving ability score on the basis of the attention level and/or the driving motivation of the driver of the vehicle (S9). In this embodiment that is configured as described above, the driving ability is divided into the driving skill that fluctuates in the long term and the short-term driving ability (the noise factor) that fluctuates in the short term. In this way, it is possible to further accurately determine the current driving ability and to appropriately provide the driving assistance control.

In this embodiment, preferably, the controller 10 is configured to execute the driving motivation determination processing (S9) to determine the driving motivation of the driver, and, in this driving motivation determination processing, to determine the driver's driving motivation at least on the basis of the driver's facial expression, driving posture, or vehicle operation.

DESCRIPTION OF REFERENCE SIGNS AND NUMERALS

1 Vehicle
10 Controller
20 In-vehicle apparatus
40 Vehicle control system
50 Information notification apparatus

The invention claimed is:

1. A vehicle control apparatus that executes driving assistance control for a vehicle such that the vehicle travels according to traffic environment and travel environment around the vehicle, the vehicle control apparatus comprising:
circuitry configured to calculate a target travel route based on the traffic environment and the travel environment and can control the vehicle such that the vehicle travels on the target travel route, wherein
the circuitry is configured to:
estimate a traffic risk score that represents a magnitude of a traffic risk caused by entry of the vehicle to a risk area in the traffic environment, the risk area including a traffic participant and/or a boundary of a travel road;
estimate a travel risk score that represents a magnitude of a travel risk in the travel environment, the travel risk destabilizing a posture of the vehicle; and
estimate a driving ability score that represents a level of driving ability for a driver of the vehicle to avoid the traffic risk and the travel risk, wherein
on condition that, based on the driving ability score, the traffic risk score, and the travel risk score, the traffic risk is avoided by the level of the driver's driving ability and the travel risk is not avoided by the level of the driver's driving ability, change a first threshold with which automated vehicle attitude stability control is initiated, so that the circuitry promptly executes the automated vehicle attitude stability control for stabilizing the posture of the vehicle,
on condition that, based on the driving ability score, the traffic risk score, and the travel risk score, the travel risk is avoided by the level of the driver's driving ability and the traffic risk is not avoided by the level of the driver's driving ability, change a second threshold, with which automatic entry avoidance control is initiated, so that the circuitry promptly executes the automatic entry avoidance control for avoiding the entry of the vehicle to the risk area, and
on condition that, based on the driving ability score, the traffic risk score, and the travel risk score, the traffic risk and the travel risk are not avoided by the level of the driver's driving ability, or based on the level of the driver's driving ability being lower than a specified level, the circuitry is configured to control the vehicle to travel on the target travel route.

2. The vehicle control apparatus according to claim 1, wherein
the circuitry is configured to notify the driver of the vehicle that the automated vehicle attitude stability control and the automatic entry avoidance control are executed when the automated vehicle attitude stability control and the automatic entry avoidance control are executed.

3. The vehicle control apparatus according to claim 2, wherein
when the traffic risk and the travel risk no longer exist, the circuitry is configured to set back the first and second thresholds to default thresholds of the vehicle.

4. The vehicle control apparatus according to claim 3, wherein
the driving ability score include a basic driving ability score and a short-term driving ability score,
the circuitry is configured to:
update a driver model by learning a vehicle operation by the driver of the vehicle, estimate
the basic driving ability score based on the driver model to avoid the traffic risk and the travel risk, and
estimate the short-term driving ability score based on an attention level and/or driving motivation of the driver of the vehicle.

5. The vehicle control apparatus according to claim 2, wherein
the circuitry is configured to
determine driving motivation of the driver at least based on the driver's facial expression, driving posture, or vehicle operation.

6. The vehicle control apparatus according to claim 1, wherein
the driving ability scores include a basic driving ability score and a short-term driving ability score,
the circuitry is configured to:

update a driver model by learning a vehicle operation by the driver of the vehicle,
estimate the basic driving ability score based on the driver model to avoid the traffic risk and the travel risk, and
estimate the short-term driving ability score based on an attention level and/or driving motivation of the driver of the vehicle.

7. The vehicle control apparatus according to claim 6, wherein
the circuitry is configured to:
determine the driving motivation of the driver at least based on the driver's facial expression, driving posture, or vehicle operation.

8. The vehicle control apparatus according to claim 1, wherein
when the traffic risk and the travel risk no longer exist, the circuitry is configured to set back the first and second thresholds to default thresholds of the vehicle.

9. The vehicle control apparatus according to claim 8, wherein
the driving ability score include a basic driving ability score and a short-term driving ability score,
the circuitry is configured to:
update a driver model by learning a vehicle operation by the driver of the vehicle,
estimate the basic driving ability score based on the driver model to avoid the traffic risk and the travel risk, and
estimate the short-term driving ability score based on an attention level and/or driving motivation of the driver of the vehicle.

10. The vehicle control apparatus according to claim 8, wherein
the circuitry is configured to:
determine driving motivation of the driver at least based on the driver's facial expression, driving posture, or vehicle operation.

11. The vehicle control apparatus according to claim 1, wherein
the circuitry is configured to
determine driving motivation of the driver at least based on the driver's facial expression, driving posture, or vehicle operation.

12. A non-transitory computer readable storage device having computer readable instructions that control driving assistance for a vehicle such that the vehicle travels according to traffic environment and travel environment around the vehicle, when executed by circuitry cause the circuitry to:
calculate a target travel route based on the traffic environment and the travel environment and can control the vehicle such that the vehicle travels on the target travel route, including
estimating a traffic risk score that represents a magnitude of a traffic risk caused by entry of the vehicle to a risk area in the traffic environment, the risk area including a traffic participant and/or a boundary of a travel road;
estimating a travel risk score that represents a magnitude of a travel risk in the travel environment, the travel risk destabilizing a posture of the vehicle; and
estimating a driving ability score that represents a level of driving ability for a driver of the vehicle to avoid the traffic risk and the travel risk, wherein
on condition that, based on the driving ability score, the travel risk score and the traffic risk score, the traffic risk is avoided by the level of the driver's driving ability and the travel risk is not avoided by the level of the driver's driving ability, changing a first threshold with which automated vehicle attitude stability control is initiated, to promptly execute the automated vehicle attitude stability control for stabilizing the posture of the vehicle,
on condition that, based on the driving ability score, the traffic risk score, and the travel risk score, the travel risk is avoided by the level of the driver's driving ability and the traffic risk is not avoided by the level of the driver's driving ability, changing a second threshold with which automatic entry avoidance control is initiated, to promptly execute the automatic entry avoidance control for avoiding the entry of the vehicle to the risk area, and
on condition that, based on the driving ability score, the travel risk score, and the travel risk score, the traffic risk and the travel risk are not avoided by the level of the driver's driving ability, or based on the level of the driver's driving ability being lower than a specified level, controls the vehicle to travel on the target travel route.

13. The non-transitory computer readable storage device according to claim 12, wherein the computer readable instructions when executed by circuitry cause the circuitry to:
notify the driver of the vehicle that the automated vehicle attitude stability control and the automatic entry avoidance control are executed when the automated vehicle attitude stability control and the automatic entry avoidance control are executed.

14. The non-transitory computer readable storage device according to claim 12, wherein the computer readable instructions when executed by circuitry cause the circuitry to:
when the traffic risk and the travel risk no longer exist, the circuitry is configured to set back the first and second thresholds to default thresholds of the vehicle.

15. The non-transitory computer readable storage device according to claim 12, wherein
the driving ability score include a basic driving ability score and a short-term driving ability score, and
the computer readable instructions when executed by circuitry cause the circuitry to:
update a driver model by learning a vehicle operation by the driver of the vehicle,
estimate the basic driving ability score based on the driver model to avoid the traffic risk and the travel risk, and
estimate the short-term driving ability score based on an attention level and/or driving motivation of the driver of the vehicle.

16. The non-transitory computer readable storage device according to claim 12, wherein the computer readable instructions when executed by circuitry cause the circuitry to:
determine driving motivation of the driver at least based on the driver's facial expression, driving posture, or vehicle operation.

17. A vehicle control method that executes driving assistance control for a vehicle such that the vehicle travels according to traffic environment and travel environment around the vehicle, the vehicle control method comprising:
calculating a target travel route based on the traffic environment and the travel environment and controlling the vehicle such that the vehicle travels on the target travel route, wherein controlling includes
estimating a traffic risk score that represents a magnitude of a traffic risk caused by entry of the vehicle to a risk area in the traffic environment, the risk area including a traffic participant and/or a boundary of a travel road;

estimating a travel risk score that represents a magnitude of a travel risk in the travel environment, the travel risk destabilizing a posture of the vehicle; and estimating a driving ability score that represents a level of driving ability for a driver of the vehicle to avoid the traffic risk and the travel risk, determining, based on the driving ability score, the traffic risk score, and the travel risk score whether the traffic risk is avoided by the level of the driver's driving ability and whether the travel risk is avoided by the level of the driver's driving ability, determining whether the level of the driver's driving ability is lower than a specified level, in response to neither the traffic risk nor the travel risk being avoided, or that the level of driver's driving ability being lower than the specified level, controlling the vehicle to travel on the target travel route, in response to the traffic risk being avoided and the travel risk not being avoided, changing a first threshold with which automated vehicle attitude stability control is initiated, to promptly execute the automated vehicle attitude stability control for stabilizing the posture of the vehicle, and in response to the travel risk being avoided and the traffic risk not being avoided, changing a second threshold, with which automatic entry avoidance control is initiated, to promptly execute the automatic entry avoidance control for avoiding the entry of the vehicle to the risk area.

18. The vehicle control method according to claim 17, further comprising:

notifying the driver of the vehicle that the automated vehicle attitude stability control and the automatic entry avoidance control are executed when the automated vehicle attitude stability control and the automatic entry avoidance control are executed.

19. The vehicle control method according to claim 17, wherein in response to the level of driver's driving ability avoiding both traffic risk and the travel risk, setting back the first and second thresholds to default thresholds of the vehicle.

20. The vehicle control method according to claim 17, wherein the driving ability score include a basic driving ability score and a short-term driving ability score, the vehicle control method further comprising:

updating a driver model by learning a vehicle operation by the driver of the vehicle, estimating the basic driving ability score based on the driver model to avoid the traffic risk and the travel risk, and estimating the short-term driving ability score based on an attention level and/or driving motivation of the driver of the vehicle.

* * * * *